Figure 1:
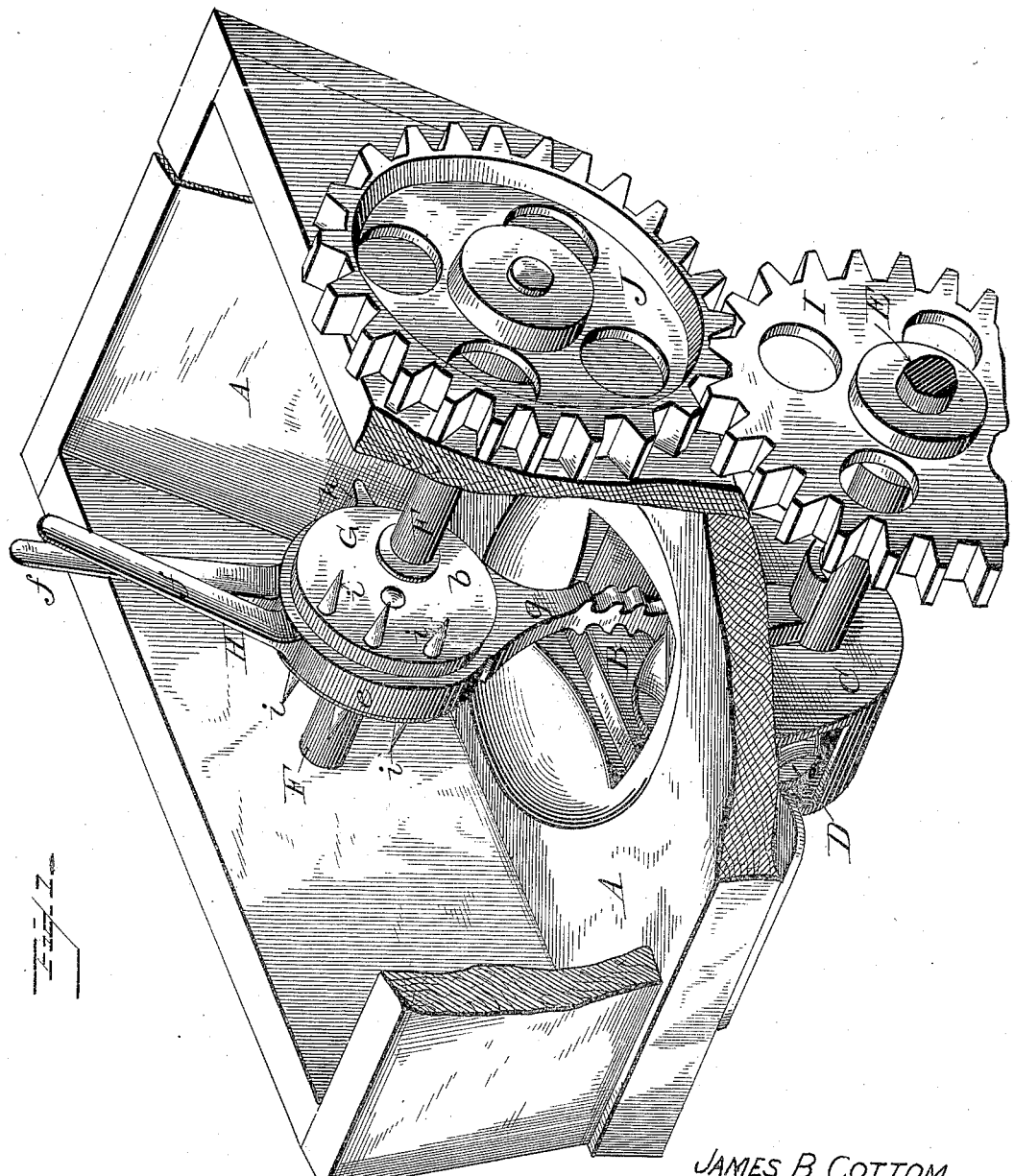

(No Model.)

2 Sheets—Sheet 1.

J. B. COTTOM.
AGITATOR FOR GRAIN DRILLS.

No. 312,975. Patented Feb. 24, 1885.

WITNESSES
Franck L. Ourand
Walter S. Dodge.

JAMES B. COTTOM,
INVENTOR by Dodge & Son,
Attorneys.

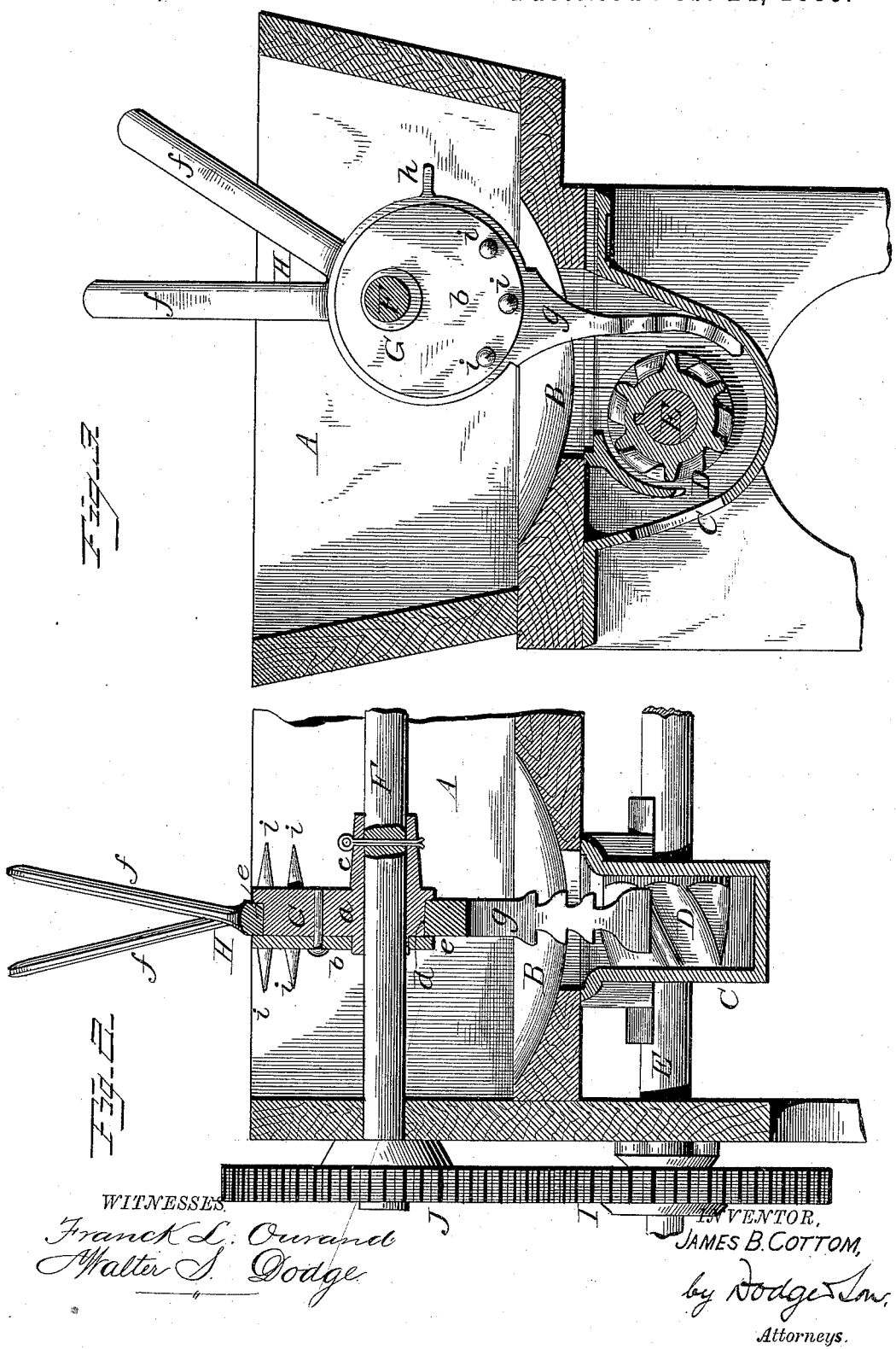

UNITED STATES PATENT OFFICE.

JAMES B. COTTOM, OF DAYTON, OHIO, ASSIGNOR TO D. E. McSHERRY & CO., OF SAME PLACE.

AGITATOR FOR GRAIN-DRILLS.

SPECIFICATION forming part of Letters Patent No. 312,975, dated February 24, 1885.

Application filed July 9, 1884. (No model.)

*To all whom it may concern:*

Be it known that I, JAMES B. COTTOM, of Dayton, in the county of Montgomery and State of Ohio, have invented certain new and useful Improvements in Agitators for Grain-Drills, &c., of which the following is a specification.

This invention relates to agitators for use in seeding-machines, grain-drills, plaster and fertilizer distributers, and all analogous machines in which material is liable to clog in or arch across the hopper or feed-box and fail to properly feed therefrom.

The invention consists in an agitator consisting of fingers extending upward and downward above and below a shaft running through the hopper, and moved in a vertical plane upward and forward, downward and backward, by an eccentric mounted upon said shaft. The upwardly-extending fingers loosen up the grain, seed, or other matter to be fed, and the lower arm serves to clear the space between the feed-wheel or roll and the wall of the cup, as hereinafter more fully set forth.

Referring now to the drawings, Figure 1 is a perspective view showing my agitator applied to a seeding-machine or grain-drill designed for sowing or drilling wheat and like grains. Fig. 2 is a section on the plane of the axis of the shaft; Fig. 3, a section at right angles to the axis of the shaft, at the side of the agitator.

The device herein shown and described is particularly designed for use in sowing or drilling bearded wheat, which, in consequence of the matting or locking together of the long beards, arch across the hopper from side to side, or across the grain-space of the seed-cup, and prevent the grain from properly falling to the feed-wheel and being fed out thereby.

In the drawings, A indicates a hopper, which in a full-sized and complete machine is several feet in length, and is provided with a series of outlets, such as shown at B, beneath each of which is placed a seed-cup, C, containing a feed-wheel or roller, D, the series of rollers of the row of cups being all secured to or caused to rotate with a shaft, E, which extends from one end of the hopper to the other, and receives rotary motion from one of the ground or carrying wheels of the machine through suitable gearing.

All these parts are or may be of ordinary construction, the drawings representing the well-known McSherry drill.

Above and slightly out of line vertically with the feed-roll shaft E is a second and like shaft, F, carrying at points exactly in line with the middle of each seed-cup C an eccentric, G, formed of two parts, $a$ and $b$, the first consisting of a disk flanged at one side, and provided with hubs $c\ c$, the other being merely a flat disk riveted to the first, and forming a second flange thereto. The flanges of disk $a$ produce an intermediate groove or annular recess, $d$, within which is seated the annular hub or band $e$ of the agitator H, which consists of a series of arms or fingers, $ff$ and $g$, the former projecting inward and the latter downward into the seed-cup, as more plainly seen in Fig. 2. A projection, $h$, is also formed at one side of the band $e$ of the agitator, and the side faces of the eccentric G are provided with studs or projections $i$, all of which passing through the grain in the hopper as the eccentric rotates serve to loosen up the grain or other matter therein and to insure its passage into the seed-cup, whence it will be discharged by the fluted roll or feed-wheel D in the usual manner. The arm $g$ extending down into the cup prevents the band $e$ of the agitator from swinging loosely about the eccentric G, which would permit the fingers $ff$ to fall out of their operative position.

In case it be deemed undesirable to have the arm $g$ project into the seed-cup, it may be smooth and carried through a guide secured at any desired point in the hopper, to answer merely the purpose of preventing the arms $ff$ from falling out of position, and in some cases it may be found desirable to remove agitator H and use only the eccentric G.

The precise form of the fingers $f$ and $g$ and of the projections $h$ and $i$ is immaterial, and may be varied as circumstances require.

Shafts E and F are connected by gear-wheels I J, or in any other convenient manner; or each may be independently connected with and driven by the ground wheel or wheels.

I am aware that agitators have before been employed to facilitate the feeding of guano and fertilizer, and of grain; but none have hitherto been constructed in the manner herein shown and described, so far as I am aware.

Having thus described my invention, what I claim is—

1. The herein-described agitator for seeding and distributing machines, consisting of shaft F, eccentric G, and agitator H, provided with fingers or projections to agitate the material, and with a guide-arm to prevent the overturning of the agitator, substantially as set forth.

2. In combination with a feed device, an agitator consisting of a revolving eccentric located within the supply-hopper, and a band encircling said eccentric and provided with projections to agitate the matter in the hopper.

3. In combination with a seed-hopper, a seed-cup beneath the hopper, and a feed-wheel within said cup, a revolving eccentric within the hopper, and an agitator carried by said eccentric, consisting of an encircling band provided with projections to agitate the material, and an arm or finger extending down into the seed-cup and serving to loosen the material within said cup and to prevent the overturning of the agitator, substantially as explained.

4. In combination with hopper A, having outlet B, seed-cup C beneath said outlet, and feed-wheel within said cup, a driving-shaft, E, for the feed-wheel, a shaft, F, within the hopper, an eccentric, G, carried by said shaft, an agitator, H, carried by said eccentric, and gearing connecting shafts E and F, substantially as described and shown.

5. In combination with hopper A, seed cup C, and feed-wheel D, rotary eccentric G, provided with studs or projections and mounted within the hopper A over the discharge-opening B, substantially as shown and described.

6. The herein-described agitator, consisting of eccentric G, provided with projections $g$, and encircling band $e$, provided with fingers $f\,f\,g$.

7. In a seeding or distributing machine, an agitator consisting of an eccentric composed of flanged eccentric $a$ and disk $b$, and encircling band $e$, provided with fingers $f\,f\,g$, all constructed, combined, and arranged to operate substantially as explained.

JAMES B. COTTOM.

Witnesses:
JAMES BRENEMAN,
E. C. BOYER.